US008600808B2

(12) United States Patent
Amidon et al.

(10) Patent No.: US 8,600,808 B2
(45) Date of Patent: Dec. 3, 2013

(54) METHODS AND SYSTEMS OF PRESENTING ADVERTISEMENTS IN CONSUMER-DEFINED ENVIRONMENTS

(75) Inventors: Christopher Amidon, Apex, NC (US); Gregory M. Evans, Raleigh, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 1339 days.

(21) Appl. No.: 11/759,532

(22) Filed: Jun. 7, 2007

(65) Prior Publication Data
US 2008/0306817 A1 Dec. 11, 2008

(51) Int. Cl.
*G06Q 30/00* (2012.01)
(52) U.S. Cl.
USPC ............... 705/14.4; 705/14.49; 705/14.66
(58) Field of Classification Search
USPC ...................... 705/14, 14.4, 14.49, 14.66
See application file for complete search history.

(56) References Cited

U.S. PATENT DOCUMENTS

| | | | |
|---|---|---|---|
| 5,794,210 A * | 8/1998 | Goldhaber et al. | 705/14.69 |
| 5,933,811 A | 8/1999 | Angles et al. | |
| 6,081,278 A | 6/2000 | Chen | |
| 6,329,986 B1 | 12/2001 | Cheng | |
| 6,456,286 B1 | 9/2002 | Arai et al. | |
| 6,758,746 B1 | 7/2004 | Hunter et al. | |
| 6,772,195 B1 | 8/2004 | Hatlelid et al. | |
| 6,948,131 B1 | 9/2005 | Neven et al. | |
| 6,954,728 B1 * | 10/2005 | Kusumoto et al. | 705/1 |
| 6,985,966 B1 | 1/2006 | Gupta et al. | |
| 7,065,550 B2 | 6/2006 | Raghunandan | |
| 7,155,680 B2 * | 12/2006 | Akazawa et al. | 715/757 |
| 2002/0007488 A1 * | 1/2002 | Kikinis et al. | 725/40 |
| 2002/0019774 A1 | 2/2002 | Kanter | |
| 2002/0046084 A1 | 4/2002 | Steele et al. | |
| 2002/0046099 A1 | 4/2002 | Frengut et al. | |
| 2002/0085031 A1 | 7/2002 | Conrado et al. | |
| 2002/0092017 A1 | 7/2002 | Klosterman et al. | |
| 2002/0095333 A1 | 7/2002 | Jokinen et al. | |
| 2002/0109729 A1 | 8/2002 | Dutta | |
| 2002/0113820 A1 | 8/2002 | Robinson et al. | |
| 2002/0120506 A1 | 8/2002 | Hagen | |
| 2002/0128907 A1 | 9/2002 | Sato et al. | |
| 2002/0152117 A1 | 10/2002 | Cristofalo et al. | |

(Continued)

FOREIGN PATENT DOCUMENTS

EP 1190579 3/2002

OTHER PUBLICATIONS

International Search Report and Written Opinion for ISR/US08/66007 mailed Sep. 8, 2008.
About Us page for www.visibleworld.com (accessed Sep. 21, 2007).

(Continued)

*Primary Examiner* — Michael Bekerman
*Assistant Examiner* — Mario Iosif
(74) *Attorney, Agent, or Firm* — Withrow & Terranova, PLLC

(57) ABSTRACT

Targeted or other advertising may comprise one or more advertisements presented in a virtual world environment constructed according to consumer parameters, with the advertisements presented according to rules, scripts, or other parameters defined by the advertiser(s). For instance, one or more consumer computing device(s) can access data defining a brand name, logo, and/or message and can access data defining consumer preferences for the context in which advertisements are to be presented. For example, the context may vary according to viewer identity, programming content, time of day, and the like. Then, the consumer computing device(s) can render a virtual world based on the consumer preferences with the virtual world also comprising the advertisement(s) generated based on advertiser definitions.

22 Claims, 8 Drawing Sheets

(56) References Cited

U.S. PATENT DOCUMENTS

| | | |
|---|---|---|
| 2002/0184047 A1* | 12/2002 | Plotnick et al. .................. 705/1 |
| 2002/0194215 A1 | 12/2002 | Cantrell et al. |
| 2002/0198746 A1 | 12/2002 | Bending |
| 2003/0005439 A1 | 1/2003 | Rovira |
| 2003/0101450 A1 | 5/2003 | Davidsson et al. |
| 2003/0139966 A1* | 7/2003 | Sirota et al. .................... 705/14 |
| 2003/0174178 A1 | 9/2003 | Hodges |
| 2004/0053690 A1* | 3/2004 | Fogel et al. ..................... 463/31 |
| 2004/0078432 A1 | 4/2004 | Manber et al. |
| 2004/0162759 A1 | 8/2004 | Willis |
| 2004/0193484 A1 | 9/2004 | Allen |
| 2004/0215568 A1* | 10/2004 | Fukushima et al. ............ 705/51 |
| 2005/0010637 A1 | 1/2005 | Dempski et al. |
| 2005/0015725 A1 | 1/2005 | Matsuda |
| 2005/0030309 A1 | 2/2005 | Gettman et al. |
| 2005/0033641 A1* | 2/2005 | Jha et al. ........................ 705/14 |
| 2005/0086605 A1 | 4/2005 | Ferrer et al. |
| 2005/0091109 A1 | 4/2005 | Howard et al. |
| 2005/0091111 A1 | 4/2005 | Green et al. |
| 2005/0132420 A1 | 6/2005 | Howard et al. |
| 2005/0179685 A1 | 8/2005 | Kake et al. |
| 2005/0216346 A1* | 9/2005 | Kusumoto et al. ............. 705/14 |
| 2005/0283796 A1 | 12/2005 | Flickinger |
| 2006/0015904 A1 | 1/2006 | Marcus |
| 2006/0026067 A1 | 2/2006 | Nicholas et al. |
| 2006/0059045 A1 | 3/2006 | Babbar et al. |
| 2006/0064645 A1 | 3/2006 | Neven et al. |
| 2006/0072724 A1 | 4/2006 | Cohen et al. |
| 2006/0100923 A1 | 5/2006 | Courchesne |
| 2006/0100928 A1 | 5/2006 | Walczak, Jr. et al. |
| 2006/0111979 A1 | 5/2006 | Chu |
| 2006/0128469 A1 | 6/2006 | Willis et al. |
| 2006/0135232 A1 | 6/2006 | Willis et al. |
| 2006/0135732 A1 | 6/2006 | Yeager |
| 2006/0148512 A1 | 7/2006 | Ekholm et al. |
| 2006/0155597 A1 | 7/2006 | Gleason |
| 2006/0184579 A1 | 8/2006 | Mills et al. |
| 2006/0212350 A1 | 9/2006 | Ellis et al. |
| 2006/0271997 A1 | 11/2006 | Jacoby et al. |
| 2006/0287915 A1 | 12/2006 | Boulet et al. |
| 2006/0288362 A1 | 12/2006 | Pulton, Jr. et al. |
| 2006/0293954 A1 | 12/2006 | Anderson et al. |
| 2007/0033107 A1 | 2/2007 | Ubale et al. |
| 2007/0061204 A1 | 3/2007 | Ellis et al. |
| 2007/0073614 A1 | 3/2007 | Jung et al. |
| 2007/0106526 A1 | 5/2007 | Jung et al. |

OTHER PUBLICATIONS

Definition of Virtual Word from Wikipedia (accessed Sep. 21, 2007).
Home Page for www.aiax3d.org (accessed Sep. 21, 2007).
Home Page for www.multiverse.net (accessed Sep. 21, 2007.
Home Page for www.diverse-vr.org (accessed Sep. 21, 2007).
International Search Report and Written Opinion for PCT/US08/74140, mailed Nov. 13, 2008, 13 pages.
International Preliminary Report on Patentability for PCT/US2008/066007, mailed Dec. 17, 2009, 6 pages.
Decision on Rejection for Chinese Patent Application No. 200880102408.2, issued Jun. 20, 2013, 9 pages.

* cited by examiner

METHODS AND SYSTEMS OF PRESENTING ADVERTISEMENTS IN CONSUMER-DEFINED ENVIRONMENTS

FIELD OF THE INVENTION

The present invention relates generally to advertising, including methods and systems that can provide for advertising to consumers using environment(s) defined by the consumers.

BACKGROUND OF THE INVENTION

Targeted or narrowcast advertising can provide a more effective model for merchants and other advertisers to reach consumers. By better matching ad content with entertainment content and user preferences, a more personalized viewing experience is possible. Thus, associated commercial content may be received more favorably. Variable delivery options for programming, advertising, and other content are due at least in part to continued development of computing devices such as set-top boxes (STBs) for cable, satellite and IPTV (internet protocol television), as well as integration of some or all such functionality into televisions and other displays. For example, so-called "interactive" ads have been proposed whereby a viewer must provide responses during the course of an advertisement, such as choices for determining an ending in an advertisement with a variable storyline. Although such options and functionality have been used to provide for different advertising systems and plans, there remains a continuing need for advertisements that appeal to consumers.

SUMMARY OF THE INVENTION

Objects and advantages of the present invention will be apparent to one of skill in the art upon careful review of the disclosure and/or practice of the subject matter. Such objects and advantages include providing methods and systems for providing advertising that appeals to consumers by presenting advertisements in one or more environments constructed based on consumer preferences.

For example, as will be discussed below, in some embodiments of the present subject matter, a consumer can view one or more advertisements that are presented in the context of a virtual world generated based at least in part on consumer-defined parameters. The advertisement presentation may vary according to parameters such as, but not limited to, the identity of the consumer(s) viewing the ad, the context (e.g. time of day, programming) of presentation, and the like. In some embodiments, the virtual world advertisements may be distributed alongside or in a manner similar to the distribution of non-virtual world advertisements so that specialized equipment may not be necessary to view the virtual world advertisements when available. Additionally, in some embodiments, the availability of virtual world advertisements may be considered in contexts such as negotiation for display of ads, consumer targeting, and ad selection.

BRIEF DESCRIPTION OF THE SEVERAL VIEWS OF THE DRAWINGS

A full and enabling disclosure including the best mode of practicing the appended claims and directed to one of ordinary skill in the art is set forth more particularly in the remainder of the specification. The specification makes reference to the appended figures, in which:

Use of like reference numerals in different features is intended to illustrate like or analogous components.

DETAILED DESCRIPTION OF THE PREFERRED EMBODIMENTS

Figure 1:
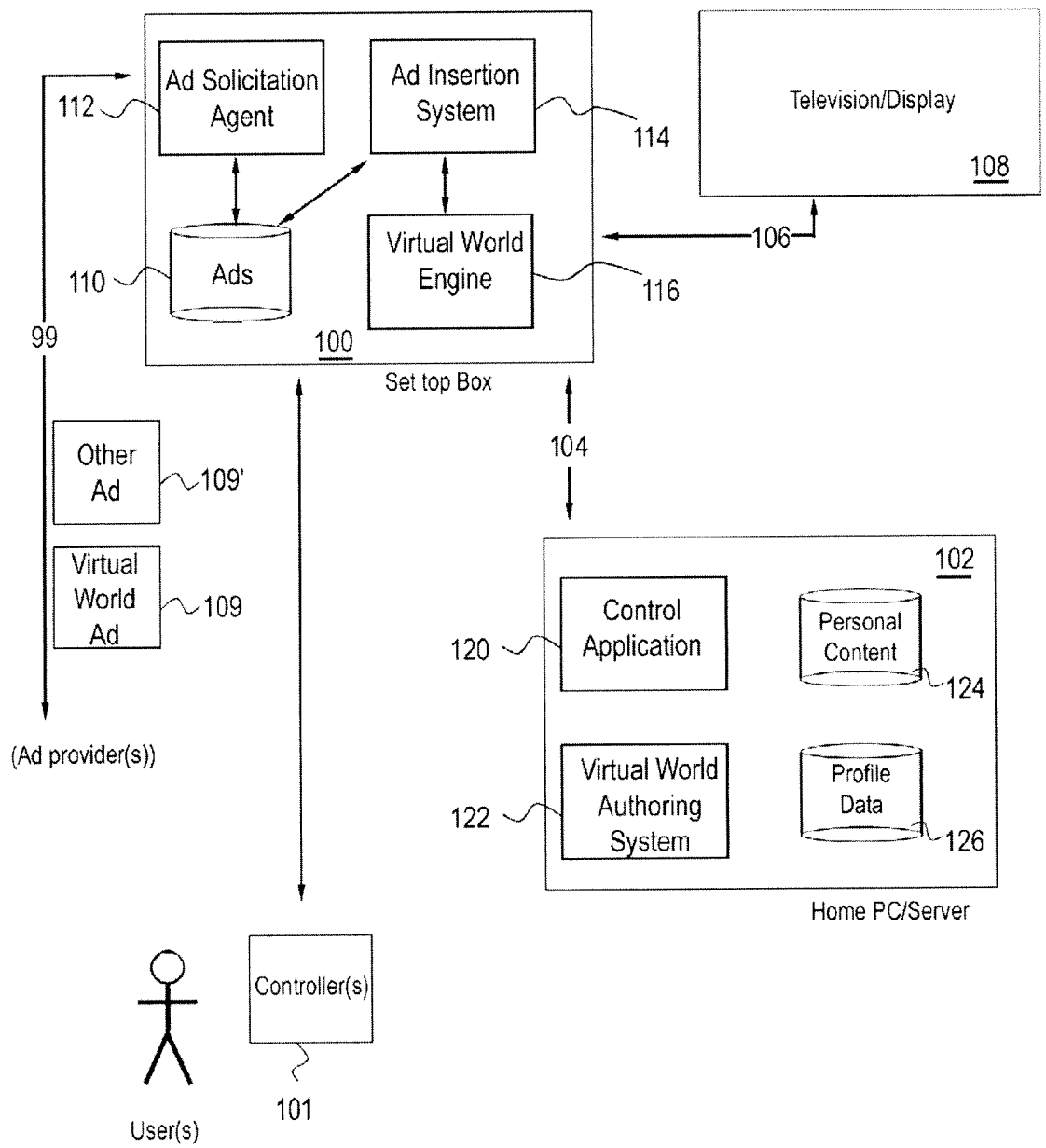
FIG. 1 is a block diagram showing components in an exemplary system for providing ads using consumer-defined context parameters.

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

The technology discussed herein makes reference to servers, databases, software applications, and other computer-based systems, as well as actions taken and information sent to and from such systems. One of ordinary skill in the art will recognize the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

When data is obtained or accessed between a first and second computer system or component thereof, the actual data may travel between the systems directly or indirectly. For example, if a first computer accesses a file or data from a second computer, the access may involve one or more intermediary computers, proxies, and the like. The actual file or data may move between the computers, or one computer may provide a pointer or metafile that the second computer uses to access the actual data from a computer other than the first computer, for instance.

The present disclosure also makes reference to the relay of communicated data over a network such as the Internet. It should be appreciated that such network communications may also occur over alternative networks such as a dial-in network, a local area network (LAN), wide area network (WAN), public switched telephone network (PSTN), the Internet, intranet or other type(s) of networks. A network may comprise any number and/or combination of hard-wired, wireless, or other communication links.

The various computer systems discussed herein are not limited to any particular hardware architecture or configuration. Any suitable programming, scripting, or other type of language or combinations of languages may be used to implement the teachings contained herein. Embodiments of the methods and systems set forth herein may be implemented by one or more general-purpose or customized computing devices accessing software instructions rendered in a computer-readable form. Embodiments of the methods and systems set forth herein may also be implemented by hard-wired logic or other circuitry, including, but not limited to application-specific circuits. Of course, combinations of computer-executed software and hard-wired logic may be suitable, as well.

Embodiments of the methods disclosed herein may be executed by one or more suitable computing devices. Such devices may access one or more computer-readable media that embody computer-readable instructions which, when executed by at least one computer, cause the at least one computer to implement one or more embodiments of the methods disclosed herein. Furthermore, components of the presently-disclosed technology, such as ad stores, may be implemented using one or more computer-readable media.

Any suitable computer-readable medium or media may be used to implement or practice the presently-disclosed subject matter, including diskettes, drives, and other magnetic-based storage media, optical storage media, including disks (including CD-ROMS, DVD-ROMS, and variants thereof), flash, RAM, ROM, and other memory devices, and the like.

Software agents are utilized in some embodiments of the present subject matter. Generally speaking, any type of software agent may be used, with the actions of the software agent based on rules, parameters, profiles, and other data provided by the agent's principal or principals, i.e., the individual(s), group(s), or other entity (or entities) directing the agent's behavior. The degree of autonomy exercised by the agent may vary, and may depend on rules or preferences specified by the agent's principal. In some instances, the rules may provide for the agent to contact one or more persons and/or other agents for additional data, such as confirmation of a course of action or further information required by the agent to evaluate a situation. Agent functionality may be handled by single agents or coordinated amongst multiple agents. Agent(s) may reside in one computing device or may be distributed amongst multiple computing devices.

An advertising system can comprise at least one computing device adapted to determine one or more advertisement presentation opportunities. For instance, a television program or on-demand movie may comprise one or more time slots for advertisements, or one or more time slots may be created by introducing breaks into a program. The at least one computing device can be further configured to: access ad definition data comprising content for a virtual world advertisement, access data comprising at least one consumer preference for virtual world advertisement presentation, and present a virtual world advertisement. Presenting can comprise rendering a virtual world based at least on the consumer preference data and generating an advertisement in conjunction with the virtual world based on the ad definition data. For instance, the ad may be presented in and/or alongside the virtual world.

The computing device(s) may be adapted by software and/or hardware, and, of course, may be adapted to perform additional tasks and provide additional functionality. For example, the computing device(s) may comprise a television set-top-box, personal video recorder, gaming device, internet appliance, a media center, server, laptop, or other computer, a personal digital assistant (PDA), cellular telephone, and the like. Some or all functionality may be integrated into the television or other display(s) that provide content to the consumer(s) viewing the content.

In some embodiments, the computing device(s) may be further adapted to select a virtual world for rendering from a plurality of virtual worlds based on the at least one consumer preference. For example, consumers may define different virtual worlds for different circumstances such as the type or rating of programming alongside which the advertisement will be presented, the identity of the consumer(s) viewing the advertisement, the advertisement type or provider, time of day, etc.

The computing device(s) may be configured to provide programming or other content and to determine an advertisement presentation opportunity. Then, the device(s) can select at least one virtual world advertisement for presentation and access data and present a virtual world advertisement in response to the selection. For example, the computing device(s) may maintain a queue of a plurality of advertisements. In some embodiments, the queue may comprise virtual world advertisements and other, non-virtual-world advertisements (such as conventional video advertisements). Selecting may comprise choosing an advertisement from the queue based on consumer preferences and other parameters. In some embodiments, the queue may define an order for presenting advertisements and, if two virtual world advertisements follow one another, the virtual world advertisements may be presented in sequence in the virtual world.

In some embodiments, the ad definition data comprises an ad script, and generating an advertisement in the virtual world comprises executing the ad script. For instance, the script may further adapt the computing device(s) to personalize a virtual world advertisement based on the ad definition data. As an example, the ad definition data may provide a plurality of content options that can be selected and/or combined to generate the advertisement. For instance, personalizing may comprise responding to a query in the ad definition data (such as in the script) by accessing consumer profiling data. Based on the query, for instance, one variant of a product may be selected for inclusion or emphasis in the advertisement over another variant.

In some embodiments, the device(s) may be adapted to continue rendering the virtual world after the ad script has been executed. For instance, an ad script may end once an ad has been presented. The computing device(s) may continue to render the virtual world for a set or unlimited time after the end of the ad script based on user preferences and/or other considerations. For example, the virtual world may continue to be rendered while other information (such as programming) is presented to the user, such as to avoid delays associated with initializing the components used to render the virtual world. In other embodiments, the virtual world may continue to be rendered and presented to the user whereby the user may remain in the virtual world even after presentation of the ad is completed. As another example, an ad script may adapt the device(s) to re-run the ad script (i.e. the ad may comprise a loop), with the user given the option to remain in the virtual world or depart after the ad script has completed a set number of loops.

In some embodiments, an advertisement presentation opportunity may comprise an ad time slot having a predetermined length. The computing device(s) may be adapted to record the programming event if the virtual world continues to be rendered and presented to the user after the end of the time slot. For example, if a user is not already recording a program, the device(s) may be configured to record the portion(s) of the program the user would otherwise miss due to the user's continuing to remain in the virtual world.

In other embodiments, virtual world advertisements may be provided based on data included in a programming stream. For example, video content may include embedded ad definition data or other information that directs the computing device to obtain data comprising a virtual world advertisement and present the virtual world advertisement at an appropriate time. The embedded data may define the time for presentation or the computing device(s) may determine the appropriate time to present the ad.

As noted above, the system can comprise one or more computing devices. In some embodiments, the system comprises at least a first and second computing device. The first computing device can be adapted to render the virtual world, generate the advertisement in the virtual world, and provide the virtual world advertisement to the second computing device, with the second computing device adapted to present the virtual world advertisement to a consumer. For example, the first computing device may comprise a home computer, server, or other device and the second computing device may comprise a set top box or other device used to actually present ads and content to viewers.

In some embodiments, the at least one computing device can be adapted to negotiate with at least one advertising entity, including establishing at least one contract regarding display of a virtual world advertisement to a consumer, download a data package comprising ad definition data for the virtual world advertisement, and provide an invoice to the at least one advertising entity if the virtual world advertisement is displayed in accordance with the at least one contract. For instance, negotiating may comprise participating in or conducting an auction for the exchange of advertising opportunities in return for incentives, such as payment or other rewards to the consumer.

Several examples of presenting ads in a consumer-defined context will be discussed below. Generally, in several of the examples, the ads are referred to as "virtual world advertisements." A "virtual world advertisement" is meant to include any advertisement wherein a virtual world is rendered and one or more advertisements are placed in and/or alongside the virtual world. Generally speaking, a virtual world is a computer-based simulated environment that can be inhabited by one or more users by way of avatars. Avatars can be representations of nearly any object or creature (real or imagined). However, in addition to avatars, a virtual world can include one or more places (such as rooms or locations), and/or other virtual world objects. In some instances, a virtual world is characterized by limitations on movement (such as gravity and topography), limitations and specifications on the interaction of objects/avatars such as behavioral rules, and/or other rules. In some embodiments, a virtual world may be rendered as an immersive environment to present a 3-D or simulated 3-D environment.

As will be discussed below, in some embodiments of the present subject matter, a virtual world is rendered based on consumer preferences/parameters while the advertisement is placed in or alongside the environment subject to rules provided by the advertiser and, in some embodiments, additional data provided by or pertaining to the consumer(s) of the advertisement.

Virtual world advertisements may be distributed in any suitable manner. In some embodiments, the virtual world advertisements are distributed alongside or instead of "traditional" advertisements such as video advertisements and interactive, but non-immersive advertisements. In some embodiments, virtual world advertisements may be distributed using embodiments of consumer-centric advertising systems discussed briefly below with regard to FIGS. 6, 7A, and 7B. However, virtual world advertisements can be distributed using any other suitable system(s), and the particular mode of distribution used in examples herein is not intended to limit the scope of the present subject matter.

FIG. 1 is a block diagram of components in an exemplary system for providing advertisements in a consumer-defined context. In this example, the system comprises set-top box 100 which is connected to content providers and ad vendors (via outside network(s) 99), display 108 (via connections 106), and home PC/server 102 (via network 104). Display 108 may comprise any suitable display such as a conventional or high-definition television, flat panel display, projection display, or any other suitable display system which may or may not include audio capabilities. Set-top box 100 may comprise any suitable computing device or devices that can be configured to select and provide video content such as television programming, advertisements, electronic programming guides, and the like. For instance, set-top box 100 may comprise a cable box, personal video recorder, internet or media appliance, or media player. Home PC/server 102 may comprise any suitable type and number of computing device(s), such as a desktop, laptop, or server computer of any architecture using any operating system.

Any or all of networks/connections 99, 104, and 106 may comprise multiple networks, and any or all of the networks may be combined. For instance, display 108 and home PC/server 102 may both be connected to set top box 100 via a home network 104. Any component may be connected to one or more outside networks such as 99. For instance, in some embodiments, network 99 may comprise the Internet, which may be used for delivery of advertisements and/or programming content. In other embodiments, advertisements and/or programming content may be delivered via other networks, such as through a cable television system, telephone system, or satellite system, for example. All of the components may be connected to one another via home network 104, the internet, and/or other outside networks.

Functionality provided by set top box 100, home PC/server 102, and display 108 may be provided by more or fewer devices than are shown in the example of FIG. 1. For instance, set top box functionality and display functionality may be integrated into a single unit. Similarly, some or all functionality provided by home PC/Server 102 may be combined with that of set top box 100. For example, a media PC or appliance may provide set-top box functions and PC functions. Thus, it will be appreciated that the configuration shown in FIG. 1 is for purposes of example only.

As shown in FIG. 1, set-top box 100 comprises several components that are used to generate and present virtual world advertisements. In this example, set-top box 100 comprises ad store 110, consumer ad solicitation agent 112, ad insertion system 114, and virtual world engine 116. Consumer ad solicitation agent 112 may comprise one or more software agents or routines adapted to contact advertising entities and obtain ad definition data. For instance, as will be discussed below, agent 112 may participate in or conduct auctions where consumer ad time is exchanged for incentives from advertising entities. In some embodiments, some of the resulting advertisements may be "traditional" (e.g. video or non-immersive interactive ads) while other advertisements are virtual world advertisements. Thus, the ad solicitation agent 112 may be adapted to consider the benefits associated with virtual world advertisements along with any applicable limitations. For example, a vendor or other advertising entity may provide for a greater incentive for the presentation of its advertising content as part of a virtual world advertisement, but the content may have certain hardware requirements, such as minimum required graphics capabilities that must be met for the consumer to receive credit for viewing the ad. Therefore, the ad solicitation agent 112 can be configured to take such considerations into account when choosing ads and negotiating for display of ads.

Set top box 100 further comprises ad store 110. For example, once ad solicitation agent 112 has successfully negotiated for the display of one or more ads, the ads may be downloaded for local storage and later retrieval. In some embodiments, ad store may comprise multiple stores, such as a hard drive or other suitable area for mid- to long-term storage and one or more buffers or queues for more immediate storage and retrieval of advertising content.

Virtual world engine 116 comprises any suitable hardware/software which, based on input parameters, can be used to render an immersive virtual environment. Virtual worlds are known for use in several different areas, such as gaming and simulations. Any suitable virtual world can be rendered and any suitable engine(s) can be used to render the world(s). Generally speaking, the virtual world will be defined by parameters that specify movement rules, permitted conduct and objects, and other constraints on activity therein. As is known, a virtual world can support various virtual entities such as avatars and objects therein. Any suitable activities can occur in a virtual world pursuant to the parameters defining the world. For advertising purposes, this can include, for example, display of a logo or graphics (2-D or 3-D), video and audio clips, interactive avatars or other objects, and the like.

Ad insertion system 114 represents software and/or hardware configured to obtain ad definition data and insert advertising content into the virtual world. For instance, ad definition data may specify the nature and extent of advertisements to be inserted into the virtual world. Ad insertion system 114 can provide commands to virtual world engine 116 so that the specified content and other activities occur in the virtual world pursuant to the ad definition data and user parameters. Advertising content may be provided in any number of ways. For example, advertising content may be inserted into the fully-rendered virtual world environment, may be included as part of rendering the environment itself, and/or may be presented alongside the virtual world. In this example, ad insertion system 114 further sends playback/mixing signals so that display 108 changes from displaying content to displaying the rendered virtual world advertisement. For instance, ad insertion system 114 may detect or create a commercial break in programming content and switch audio/video playback from the programming content to a view of the virtual world rendered using engine 116 with advertisement(s) therein. As will be discussed later below, in some embodiments and at some times, system 114 may display the rendered virtual world even after an advertisement has been presented.

FIG. 1 further illustrates virtual world controller 101, which represents any suitable hardware component or components that a consumer (or multiple consumers) can use to interact with a virtual world advertisement. For instance, controller 101 may comprise a remote control for set top box 100, an interface device such as a mouse or tablet, or a game controller of any suitable type. The amount of interaction/control that may be exercised generally will depend on the capabilities of the system, ad content and virtual world parameters, and the desire of the consumer to interact with, explore, or otherwise utilize the environment of the virtual world.

Computing device 102 (shown in this example as PC/Server 102) comprises one or more suitable devices that can be used in support of the virtual world advertisements in some embodiments. For instance, device 102 may include storage of personal content 124 and personal profile data 126 which may be used to determine which virtual world(s) to utilize, how to render advertisements, and which virtual world advertisements should be solicited by the system. For example, the consumer may provide preferences and other parameters controlling operation of the system using control application 120. As with the other functionality provided by device 102 in this example, control application 120 may be provided using set top box 100 in other embodiments. Virtual world authoring system 122 may represent any suitable application or groups of applications that can be used by consumers to construct and define virtual worlds. Authoring system 122 may, for example, comprise any world creation tool or tools such as AJAX3D, DIVERSE, Multiverse, and the like. In some embodiments, consumers may access templates or fully-defined virtual world environments. For instance, users may generate and share environments or purchase environments from third-party providers. As another example, system 122 may comprise one or more virtual world authoring tools adapted to construct or modify gaming environments.

In some embodiments of the present subject matter, the advertising consumer provides various parameters, such as preferred virtual environments, conditions for virtual world selection, and profiling data, which are used to customize the context in which advertisements are presented. For instance, rather than being force-fed advertisements, the consumer is provided an additional level of control since the advertisements are presented in the consumer-defined context. Simultaneously, however, the advertising content is subject to rules and restrictions provided by the advertising entity so that the message of the ad is not lost.

For example, a consumer may be watching television programming alone and configure the system to deliver all ads in a virtual re-creation of Fenway Park baseball stadium. For example, the baseball stadium environment can be rendered using a third party gaming system or gaming engine included as part of set-top box 100. As the consumer watches the ad, memorable plays can be re-enacted in the virtual world while the ad is displayed therein. For example, the ad may be displayed in conjunction with the virtual world, such as an ad presented alongside the virtual world (such as a picture-in-picture). As another example, the ad may be incorporated into the virtual world, such as presented in the stadium on a simulated jumbo screen or on a blimp visible above the stadium. As another example, the consumer may configure the system so that, when the consumer and the consumer's spouse are watching television together, ads are presented on a virtual TV in a simulated beach environment where avatars representing the consumer and spouse are relaxing. However, these examples are not intended to be limiting. For instance, other avatars or objects could be defined in the ad and interact with the viewers.

In some embodiments, virtual world advertisements can be defined using one or more digital files that comprise content for the virtual world ads. For instance, the file(s) may comprise a package that is handled within advertising negotiation and distribution systems in a manner similar to how such systems handle other, non-virtual-world ads (such as video ads). For example, the package may comprise one or more XML files that define the ad, along with one or more vendor supplied content items such as videos, graphics, and the like. Within the XML file, scripts may be utilized to define the various components, interactions, rules, and other advertisement parameters. The scripting language or format may be dependent on the type of virtual world engine that is used. For instance, one or more standards may be defined for the XML format for advertisers to abide by in construction of advertising packages. Advertisers may construct packages in any suitable manner, for example using authoring applications and/or manual construction.

The table below provides an exemplary XML file for a hypothetical virtual world ad provided to advertise a hypothetical cola ("SuperSoda"). However, any structured format can be used to define the ad. In this example, one of two possible video ads is played within the virtual environment depending on how many people are in the room. Additionally, an avatar, configured by the user, is utilized to introduce the ad. For example, the user may provide various avatars for use in virtual world ads that require the use of an avatar. For instance, a user may define an avatar based on him/herself or another avatar, such as a fanciful creature, for example. The user-defined avatar can be selected and then acts according to the ad specifications.

TABLE 1

Hypothetical Virtual World Ad Definition File

```
<CAPS-Advertisement>
<Header>
    <Vendor = "SuperSodaCo"/>
    <Ad Id = "123456"/>
</Header>
<Attachments>
    <ID="ab123" type="graphic" name="soda.gif"/>
    <ID="abc88" type="video" name="ad1.m2p"/>
<ID="abc89" type="video" name="ad2.m2p"/>
</Attachments>
<script>
    <!-- The scripting syntax varies based on the supporting
    virtual world -->
    avatar1 = load_avatar(from_user, male, 0,0);
    avatar1.say("Hello", username, pause, "have you had a
    SuperSoda lately?");
    if (num_users == 1) {
      play_video("abc188", video_slot1);
    }
    else {
      play_video("abc189", video_slot1);
    }
</script>
</CAPS-Advertisement>
```

Consumer ad solicitation agent 112 can utilize any suitable method or methods to identify and select ads. For instance, in some embodiments, an auction-based system can be utilized whereby the user defines preferences and/or profiles from which an auction agent or agents engage in negotiations to obtain and use the "best" ads. For example, the auction agent(s) may be configured to give higher value to virtual world ads, and the preference may override other preferences such as economic value. Additionally, as noted above, ad definition data may depend on particular rendering engines and other specific functionality. For example, if the virtual world engine is included in a set-top box, then the particular virtual world engine implementation may vary across set-top box manufacturers. Therefore, consumer auction agents may be configured to validate ads to ensure the ads are compliant with the components of the system such as virtual world engine 116 and insertion system 114.

In some embodiments, each virtual world environment created/selected by a consumer may be associated with a profile. The profile can be used to define when the virtual environment should be utilized in a virtual world advertisement. For instance, in the example above, the Fenway Park environment was used when the consumer was alone but the beach environment was used when the consumer's spouse was also present. Other parameters which may be used in selecting the environment include, but are not limited to: identity and/or number of viewers, time of day, date/season, genre of programming content, and rating or other content metadata associated with the programming content.

Figure 2:
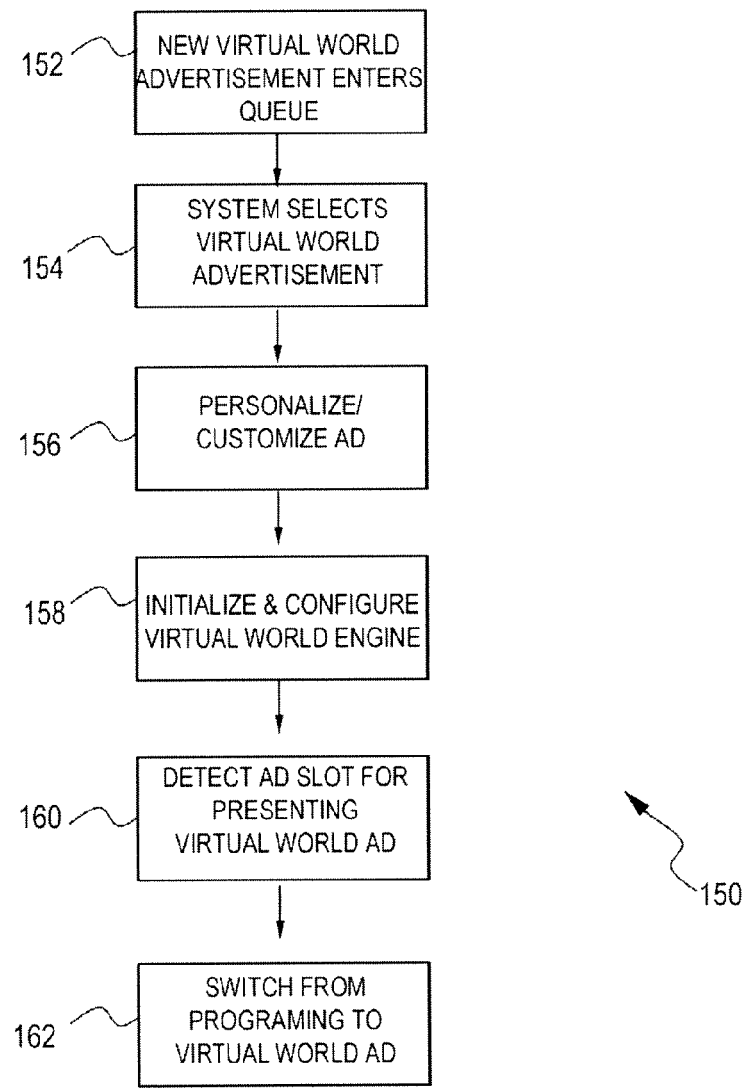
FIG. 2 is a flowchart showing steps in an exemplary process for presenting a virtual world advertisement.

When virtual world advertisements are to be provided, in some embodiments, buffering is preferably used so that the system is ready to invoke the virtual environment and display the advertisement(s) at the proper time. For instance, buffering may be provided in conjunction with management of an ad queue. Turning to FIG. 2, an exemplary process 150 for preparing for display of a virtual world advertisement is shown. At step 152, a new virtual world ad enters the ad queue. For instance, a consumer auction agent may have successfully negotiated for display of an ad and the ad is downloaded to set top box 100. The size of the queue(s) or other buffer(s) can vary and may be configurable. Eventually, a late binding agent or other component responsible for queue management may determine a time for presentation of an ad and, since in this example a virtual world advertisement is available, the virtual world advertisement is selected for display. Then, at step 154, a virtual world is selected for use. For instance, as noted above, a consumer may define multiple environments for different circumstances.

At step 156, the ad is personalized/customized. For example, as noted above, the content of the ad may vary according to the circumstances of presentation, such as a different video based on the number of users. However, the amount and extent of customization can be more varied. For instance, ad definition data may comprise data defining user-specific rules, actions, and content that augment or alter the virtual environment and/or objects therein. For example, an ad script may include one or more queries or require inputs to custom-tailor advertising content to a particular consumer or consumers. The ad script may request information, such as the user's name, age, and demographic information. In some embodiments, the request(s) may be provided as one or more queries and one or more computing devices comprising the ad delivery system (such as the set-top box) may be configured to automatically respond to such queries. The queries may be simple or complex. For example, if the consumer maintains a local store of profiling data, for example via PC/server 102 or other suitable device(s), then certain ad scripts may query the profiling data for more detailed information. In some embodiments, ad scripts can directly query profiling data, while in other embodiments the query or queries are provided indirectly.

In some embodiments, ad personalization and other setup aspects are preferably timed to reduce or avoid lag between the time that an ad presentation opportunity begins and the time that an ad starts. However, in some instances, some or all aspects of personalization (and/or other aspects of setting up an ad) do not occur until the ad is actually played back or shortly beforehand, since in some cases the actual identity or identities of viewers may be uncertain until playback time. For example, if ads are set up/personalized too early, such as when the ad first arrives in the queue (or otherwise arrives at the system), the personalization/setup may be based on data that becomes stale between the time of personalization/setup and playback. Thus, in some embodiments, the system may balance the need for recency in data against the need to avoid lag in playback.

At step 158, the virtual world engine is initialized and/or configured for presentation of the ad. For instance, hardware and/or software components may be used to render the virtual world and present the ad content therein. In some embodiments, the underlying hardware and/or software routines for presenting the virtual world may be fully or partially initialized in advance of ad presentation. For example, if a game system or other specialized hardware is used to present the virtual world, the hardware may remain active even after a virtual world ad is finished or may only be partially shutdown (e.g. standby). As another example, software modules or components used to render the virtual world may remain resident in memory for quick re-initialization rather than being fully loaded and initialized for each ad.

At step 160, the time for presenting the ad actually arrives. The time between initial preparation of an ad and the time of actual playback can depend on factors such as system capabilities (such as memory and processing power) as compared to the complexity of the virtual world ad to be displayed. At step 162, the system switches video output to screen 108 (or other viewing device) to depict the virtual world as provided by virtual world engine 116. Although in this example the virtual world is presented by set top box 100, in other embodiments, some or all rendering of the virtual world and/or advertisement content therein may be provided from another computing device, such as a PC, a gaming system, or any other suitable device or devices. The particular characteristics of switching and the signals sent to and amongst computing devices in order to present programming, virtual world advertisements, and other data will vary according to the hardware implementation, of course.

In some embodiments, when the virtual world engine 116 is launched, any viewers present are logged into the system in any suitable manner. For example, viewers may be recognized using image recognition, RFID tags, or presence may be inferred based on analyzing viewing activity. In some embodiments, the virtual world engine may remain active even when not viewed in order to reduce system loads associated with launching and exiting the virtual world engine.

Figure 3:
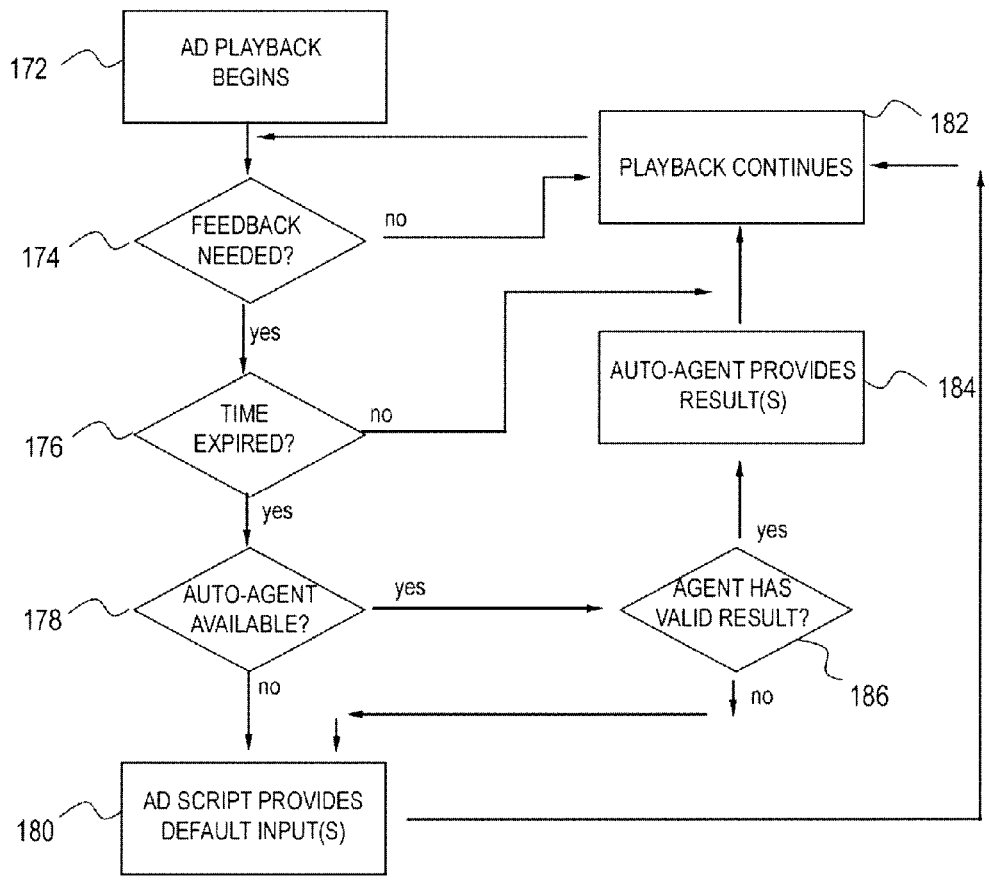
FIG. 3 is a flowchart showing steps in an exemplary playback process for a virtual world advertisement.

FIG. 3 is a flowchart showing steps in an exemplary process 170 for playing back a virtual world advertisement. Of course, as is the case of all flowcharts in the present specification, the steps may be reordered or varied in other embodiments. The ad playback process will vary according to the script(s) associated with each ad. For instance, an ad in which no feedback is possible or provided may proceed in a fairly direct manner as compared to an ad whose script provides for multiple outcomes contingent on user activity. Generally speaking, the ads are executed within the virtual world environment according to the ad script and user preferences, with advertisement playback under the control of the virtual world environment.

In this example, ad playback begins at step 172. At 174, the system evaluates whether viewer feedback is needed. If not, then at step 182 playback continues. If viewer feedback is required and a time limit is applicable for feedback, then at 176 the time limit is monitored. If time remains for feedback, the advertisement loops back to 182. If, however, an applicable time limit has expired, then at 178 the system determines if an auto-completion agent is available. The set-top box or other device(s) associated with providing the virtual world advertisements may be configured to automatically respond to queries and other requests for information from ad scripts by using components such as one or more auto-completion agents. If the user has not manually provided feedback in the allotted amount of time, then the auto completion agent ("auto-agent" in FIG. 3) can provide a response as shown at 186 and 184. In some embodiments, the time limit may vary and/or no time limit may be considered; for example, a user may configure an auto-completion agent to automatically respond to some or all queries without waiting for a time period to elapse. If an auto-completion agent is not available, or if an available agent cannot provide a valid response, then at 180 the ad script provides a default response and ad playback continues. For example, the ad may continue for a predetermined time and/or until the ad script otherwise completes.

An auto-completion agent may comprise a system component "between" the user and the virtual world. For instance, an auto-completion agent may access data outside the virtual world, such as viewer profile data, in order to provide information to a virtual world ad. Although in this example, an auto-completion agent is discussed in the context of providing a response during ad playback, auto-completion agents may provide data at other times such as, for instance, when an ad is initially configured for playback or after playback. For instance, as the ad is prepared, one or more queries can be processed against the preferences/profiles of one or more users associated with the system. For example, if the system recognizes an owner, the owner or primary user's data may be used. In any event, auto completion agent(s) can provide responses to queries from ads based on data such as user preferences, personal profile information, and/or public profile information. Other data sources available to the auto-completion agent may be used in addition or in alternative to those sources.

In some embodiments, an auto-completion agent additionally or alternatively comprises an object, avatar, or other representation within the virtual world. For example, in an advertisement set in a virtual bar, a bartender avatar may ask the viewer what drink the viewer prefers. If the user does not respond, an auto-completion agent represented by another character at the bar may provide a response based on preference data for the viewer.

An auto-completion agent can be implemented as a software agent, process, component, or routine configured to provide information and otherwise interact with an ad. Additionally, an auto-completion agent can interact with a viewer and/or data regarding a viewer. Of course, any auto-completion agent may comprise one or more agents, processes, components, etc. working together and, in some embodiments, a system can comprise or support multiple auto-completion agents. Additionally, as was noted above, ad scripts can include default responses for each possible decision point. This may advantageously avoid a never-ending advertisement while the ad script awaits input. For example, if a suitable auto-completion agent is not available (or no suitable response is provided), then a default response may be used.

Auto-completion agents can obtain data in any suitable manner. For example, an ad may provide a specific query for use by auto-completion agents in determining a response. However, in some embodiments, the auto-completion agent(s) may parse a query in order to determine the best way to determine how to respond. For instance, a cola advertiser may wish to determine if the user would prefer regular or diet soda and provide for a different ad according to the user's preferred drink. A query from the ad may comprise "preferred soda type," with the auto-completion agent determining the exact syntax to use in searching user purchase (and/or other) records. Alternatively, an ad script provided in ad definition data for an advertisement by the cola advertiser may include a query such as "SELECT * FROM user purchases WHERE type='drink' and name contains 'diet'". The auto-completion agent may be configured to evaluate the results of the query in order to provide a response to the ad script. For instance, if the result set is over a certain threshold, the auto completion agent may conclude that the user prefers diet drinks and provide that data to the ad script. If the query returns an error or there is no conclusive answer, then the auto completion agent is set to "unknown" for the decision point. In such a case, the ad script would revert to the default response for determining which script alternative to utilize. The format and context of the query may vary based on ad parameters, ad delivery systems, and the underlying data source(s) used to obtain data for responding to queries.

Figure 4:
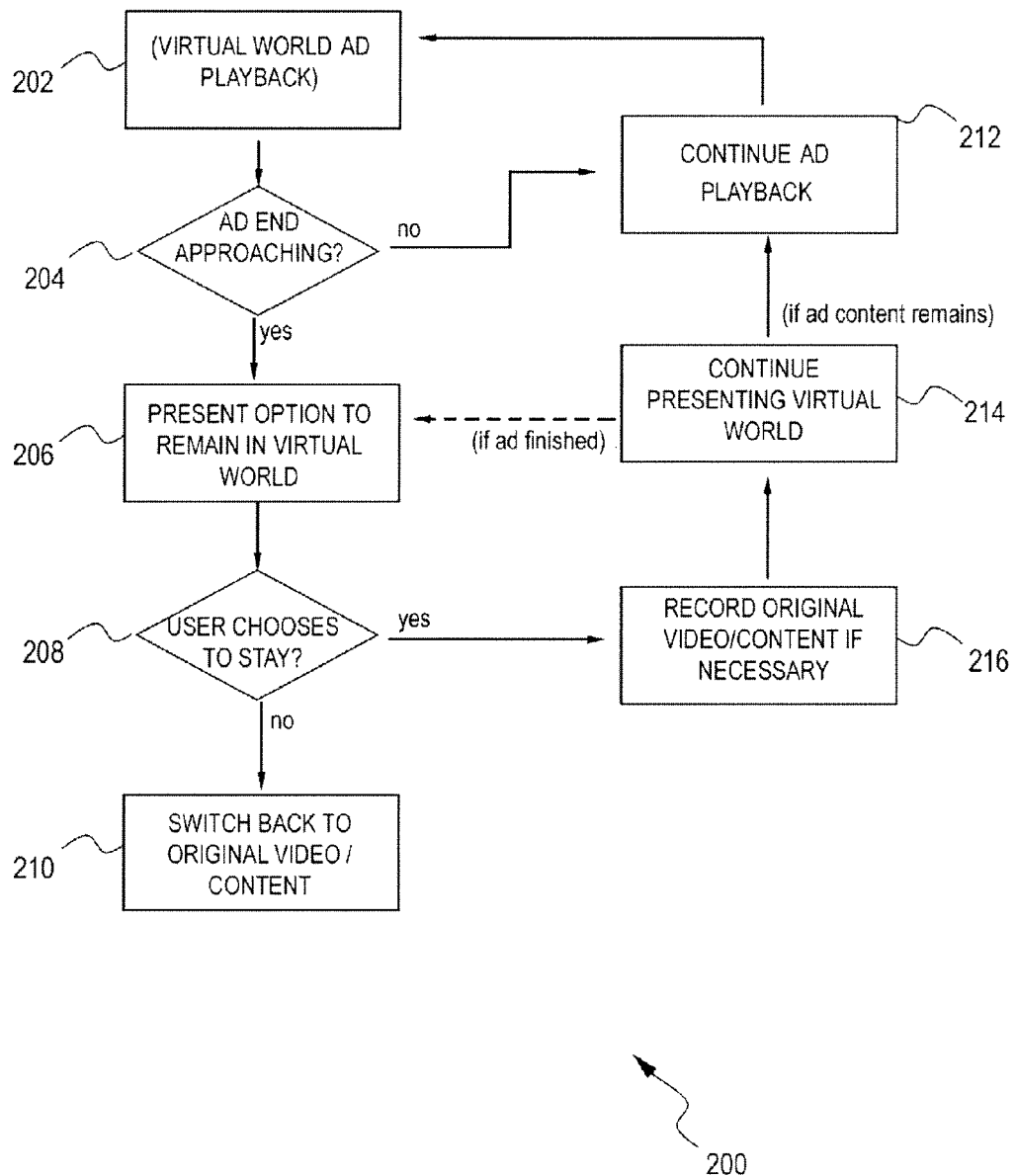
FIG. 4 is a flowchart showing steps at the end of an exemplary playback process for a virtual world advertisement.

FIG. 4 is a flowchart showing steps in an exemplary process 200 which may occur when an ad nears completion. For instance, in some embodiments, the virtual worlds may catch the attention of the user and give the user the ability and option to explore further within the virtual world or further investigate the ad within the virtual world. Thus, the user may remain in the virtual world beyond the duration of the ad. Step 202 represents the playback of a virtual world ad. At step 204, the system evaluates whether the end of the ad is approaching. For example, the ad may be set to run for a limited time or the end of the ad script may be near. If the end is not near, then at step 212 playback continues. If the end is approaching, then at step 206, the user may be presented the option to remain in the virtual world. If, at step 208, the user elects not to stay, then at step 210 the system switches back to the original video or other content stream. For example, the system may switch back to programming content or additional advertising content such as non-virtual-world ads.

However, if at step 208 the user elects to stay, then at step 216 the original video or other content stream may be recorded. For example, if the ad is provided using a set-top box with personal video recorder (PVR) capabilities, the PVR components may be signaled to record the content if the content is not already being recorded or has not been recorded previously. At step 214, the virtual world continues to be rendered. If an ad has fully run its course, the process may loop to 206 so that the user may be periodically presented with the option to return to the video stream. For instance, a pop-up or notification may occasionally appear, or the system may simply occasionally check for an input such as a "return to video" command from a controller. Until the user indicates otherwise, the user may remain in the virtual world. If ad content remains, then the process loops from 214 to 212/202 to continue ad playback. For instance, all of the advertisement, or portions of the advertisement may continuously play for the entire time the user is in the virtual world after the end of the initial run of the ad. For example, if the ad comprises a sign in the virtual world, the sign may remain in the virtual world until the user exits. If the ad comprises an interactive script, then the script may run a set number of times and then end rather than repeating ad nauseum.

Figure 5:
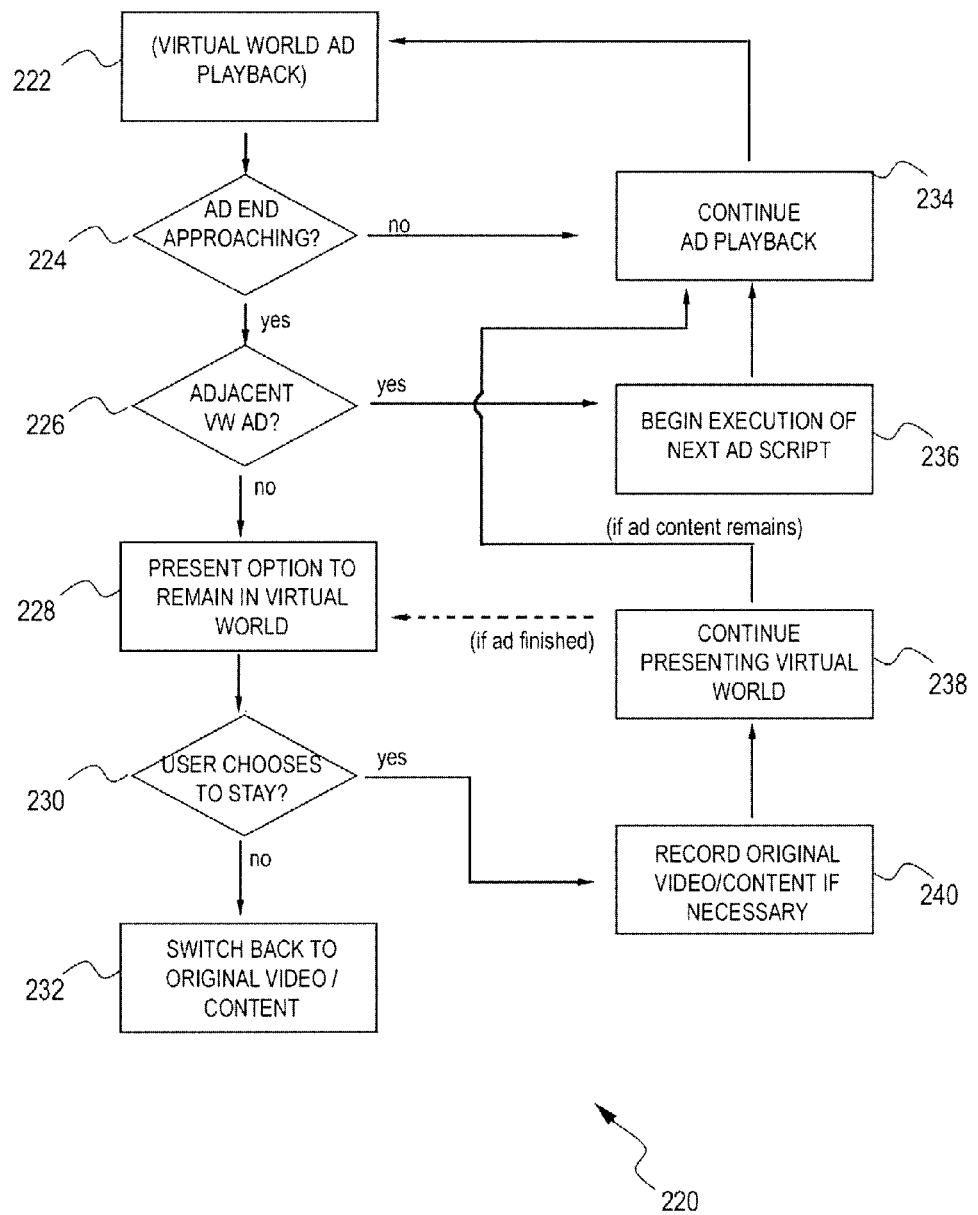
FIG. 5 is a flowchart showing steps in an exemplary process for presenting multiple virtual world advertisements.

FIG. 5 is a flowchart showing steps in an exemplary process 220 wherein multiple virtual world advertisements are presented in sequence. At step 222, ad playback continues. At step 224, the system determines whether the end of an ad is approaching. If not, then at step 234 playback continues. If the end of an ad is near, then at step 226 the system determines whether another virtual world advertisement is "adjacent." For instance, in some systems, a queue or buffer of ads may be maintained, with the queue representing an order of presentation for the ads. If one virtual world advertisement immediately follows another in the queue, then at step 236 the system may begin execution of the next ad script within the virtual world. As a prelude to step 236, the initial preparations for the next ad may begin while the first ad is in progress. Then, playback continues at 234 and 222 until no further adjacent virtual world advertisements are available. At step 228, the user is presented the option to remain in the virtual world. If, at step 230, the user elects to stay, then at step 240 the system provides for recording of the video (or other content) stream if necessary and at 238 continues presenting the virtual world. If ad content remains, then playback of the current ad occurs as shown at 234/222. However, if no more ad content remains, then the process loops to 228 so that the system occasionally presents the option/monitors for feedback indicating that the user wishes to return to the video stream. If, at 230, the user elects to leave the virtual world environment, then at 232 the system switches back to the video stream or other content presentation. For example, the system may switch back to programming content or additional advertising content such as non-virtual-world ads.

Figure 6:
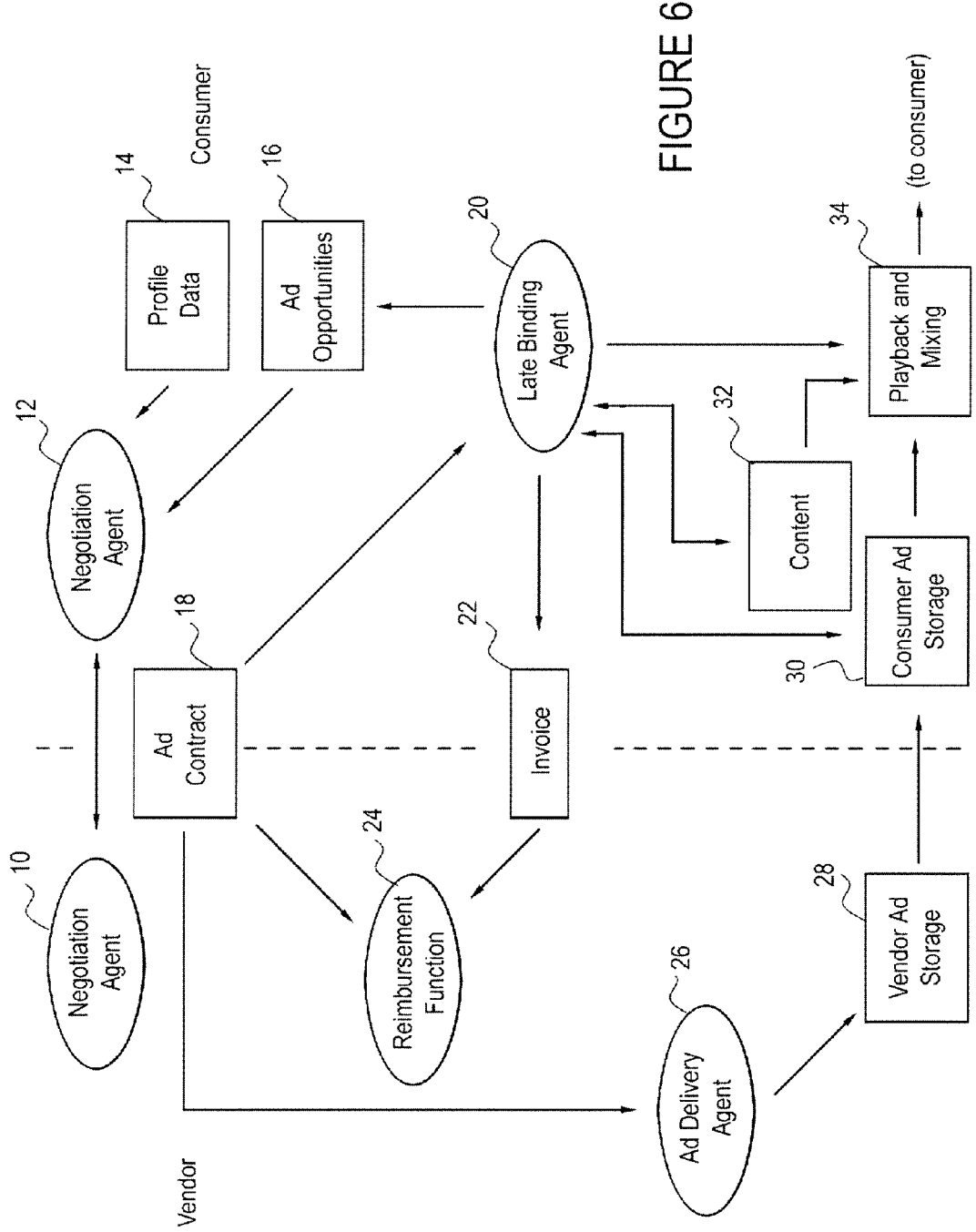
FIG. 6 is a functional block diagram of an exemplary consumer-centric advertisement distribution system.

As noted above, in some embodiments, ads may be distributed alongside or instead of conventional advertisements (i.e. non-virtual-world-advertisements) in an advertisement distribution system. FIG. 6 is a functional block diagram of an exemplary consumer-centric advertisement distribution system which may be adapted to support distribution and display of virtual world advertisements. For instance, functionality discussed in the examples above may be added to systems through additional components and/or alteration of components originally configured to obtain and provide conventional ads (i.e. non-virtual-world ads). For example, software or hardware plug-in components may be provided to enable a conventional ad distribution system to support virtual world advertisements.

However, before turning to FIGS. 6-7, it is worth emphasizing that discussions of exemplary distribution systems are not meant to limit the present subject matter. Instead, virtual world advertisements can be provided using any suitably-configured distribution system or systems. For example, in several of the foregoing examples, a virtual world advertisement was received and stored in a queue, such as by downloading a package defining the advertisement. However, in other embodiments, virtual world advertisements may be received as part of a broadcast or video stream. For example, an MPEG-2 (or other suitable) video stream may contain a virtual world advertisement. The video stream may comprise the actual advertisement data (such as ad definition data) or a link or other specifier identifying where to obtain the data. The computing devices that provide the virtual world advertisements can be configured to look ahead into the video stream and identify/obtain the components in order to prepare and present virtual world advertisements as discussed above. However, rather than processing an ad based on its position in an ad queue, the ad can be processed when the look ahead function identifies an ad in the video stream. Combinations of queue-based distribution, stream-based distribution, and/or other distribution modes can be used, as well.

FIG. 6 is divided by a dashed line illustrating the division between components on the vendor side and the consumer side. This example will first discuss an exchange between a consumer and a single vendor. However, as will be noted below, in some embodiments, each consumer may interact with multiple vendors and/or each vendor may interact with multiple consumers. Additionally, while a vendor is the advertising entity in several examples herein, the use of a vendor is not intended to be limiting. Rather, advertising entities may comprise other types of single individuals, groups of individuals, or other entities seeking to advertise to one or more other individuals, groups, or entities.

In operation, a software-based negotiation agent (or multiple agents) 10 acting on behalf of a vendor engage in negotiations with corresponding software-based negotiation agent (or agents) 12 acting on behalf of the consumer. Negotiation agent(s) 12 may include functionality provided by ad solicitation agent 112 in the examples above or a separate agent may be utilized for obtaining virtual world advertisements. Consumer negotiation agent 12 accesses data including profile data 14 and ad opportunity data 16 and, based on the profile data 14, ad opportunity data 16, and any other consumer-specified rules, preferences and parameters, attempts to negotiate one or more ad contracts 18 between the vendor and the consumer. Ad opportunity data 16 is provided at least in part by late binding agent 20, which will be discussed in further detail below. Generally speaking, ad opportunity data 16 represents information indicating what resources (including both time and hardware) are available for negotiation.

Assuming a successful negotiation, ad contract 18 is established between the consumer and a vendor. Then, based on ad contract 18, several actions take place. On the vendor side, the data in ad contract 18 is used by vendor ad delivery agent to select one or more ads stored in vendor ad storage 28 to deliver to the consumer's ad storage 30 in accordance with the contract. On the consumer side, late binding agent 20 uses data including terms from ad contract 18 to display the ad(s) in accordance with the terms of the contract. Playback and mixing circuitry/software is directed by late binding agent 20 to mix stored content 32 and one or more stored ads 30 for display to the consumer. Then, late binding agent 20 generates and transmits invoice 22 to the vendor based on the terms of contract 18. Invoice 22 is received by reimbursement function 24, which may be another software routine or agent configured to compensate the consumer based on the terms of ad contract 18. For virtual world advertisements, late binding agent may include functionality provided by ad insertion system 114 or may work in conjunction with ad insertion system 114 in some embodiments.

Aspects of the exemplary components shown in FIG. 6 will now be discussed in closer detail. Vendor negotiation agent 10 and consumer negotiation agent 12 may each comprise any suitable type of software agent that engages in one or more negotiations according to rules specified by the party on whose behalf the agent is acting.

For instance, in some embodiments, consumer negotiation agent 12 comprises an auction agent that auctions advertising opportunities to one or more vendors. In such embodiments, vendor negotiation agent 10 can comprise an auction bidding agent. When configured as an auction agent, consumer negotiation agent 12 may offer advertising opportunities to one or more vendors in exchange for economic incentives. Depending upon consumer and vendor preferences, these incentives can include any suitable transfer of value or services, including, but not limited to, payments from the vendor, discount coupons, or free items or content. The desired economic incentive can be included in factors defined by the consumer for use by agent 12 in conducting the auction and evaluating bids.

For instance, the consumer-defined factors may include but are not limited to: the degree an offered ad matches the consumer's tastes and interests, availability of bandwidth for receiving ads, availability of ad storage space, availability of time for viewing the ad, and the consumer's willingness to view advertisements. For virtual world advertisements, as noted above, another consideration may include whether a particular advertisement is compatible with the consumer's system (e.g. whether the ad format is compatible with the consumer's virtual world engine). When multiple vendors wish to purchase the same advertising opportunity, the consumer may select the most desirable vendor(s) in terms of the incentive that is offered and other characteristics such as the particular vendor, the type of product being advertised, and the nature of the advertisements. In some situations, competition amongst the vendors may result in more incentive per advertising opportunity offered by the consumer.

Some factors defining the conduct of agent 12 may be explicitly defined by the consumer, such as a minimum payment or discount that must be received or a maximum amount of advertising time that is to be made available. However, some factors may be inferred from information regarding the consumer that is available to negotiation agent 12. For instance, consumer profile data 14 may be used by negotiation agent 12 to determine areas of interest (and disinterest) for the consumer. Profile data 14 may comprise any information about the consumer that is available from any source or sources. Profile data 14 may include consumer content and advertising viewing records, purchase and financial records, and personal and demographic information about the consumer. In some embodiments, profile data 14 may comprise a plurality of sets of profile data about a consumer. The sets can include public profile data that is available for release to potential advertising providers as part of the contract negotiation or execution and private profile data that is available only to consumer agents such as negotiation agent 12 and late binding agent 20.

Consumer negotiation agent 12 may also consider other data. For example, FIG. 6 shows that ad opportunity data 16 has been provided by late bidding agent 20 for use by negotiation agent 12. Ad opportunity data 16 may include data that indicates the type and extent of advertising opportunities that are available for negotiation. For instance, ad opportunity data 16 may comprise scheduled recordings, downloads, or viewings of content. Additionally or alternatively, ad opportunity data may indicate the consumer's viewing status in real-time or near-real time. For example, if a consumer is viewing a program, ad opportunity data may include unsold or otherwise uncommitted advertising time for the program that is being viewed. The ad opportunity data may also include information indicating available ad storage space and network bandwidth for receiving ads.

Vendor negotiation agent 10 may comprise an auction bidding agent acting on behalf of a vendor based on various rules, preferences, and other parameters specified by the vendor. For instance, a vendor may provide rules that specify how advertising opportunities are to be valued and how bidding is to proceed. Bids may be determined based on factors including, but not limited to, the match of an ad to a consumer, the length of the ad, the size and quality of storage and other resources needed to display the ad, and the initial bidding price offered for the ad. The vendor may maintain one or more data stores that include information used by the vendor to value advertising opportunities. For example, vendor negotiation agent 10 may have access to one or more databases that define the vendor's advertising budget, objectives, and strategy. For instance, the vendor may desire to target certain groups or types of consumers more heavily than others. Vendor negotiation agent 10 may be configured to provide greater incentives for ad opportunities related to the targeted consumers and less (or no incentives) to the non-targeted consumers.

Regardless of the type of negotiation, as noted above, consumer negotiation agent 12 may be configured to release certain information about a consumer as part of the negotiation process with vendor negotiation agent 10. For instance, vendor negotiation agent 10 may access information about the consumer to determine if the consumer is in the desired audience for a particular advertisement. In embodiments in which vendors bid on advertising opportunities, the bid price offered by vendor agent 10 may increase for consumers that are a more "desirable" match as defined by the vendor. Similarly, in embodiments in which consumer agents solicit for the opportunity to receive ads and advertising incentives, vendor agents 10 may consider the degree of match in determining which consumer bids to accept. As an example, if the vendor is a local microbrewery, the vendor negotiation agent 10 may evaluate potential advertisement opportunities based on whether the consumer that is providing the opportunities is in a certain age/income demographic and/or has bought beer recently. For instance, the microbrewery may configure its agent to bid only in consumer auctions offered on behalf of beer drinkers, or may configure its agent to bid lower in auctions offered by moderate beer drinkers. In situations in which the brewery is offering advertisements to be solicited by consumers, the brewery agent may be configured to reject offers from moderate beer drinkers, even if such offers are lower (i.e. cheaper) than those of beer drinkers.

The level of detail of the information released to vendor agent 10 may vary based on consumer privacy settings and may affect the bidding price or incentive amount the vendor is willing to offer. For example, if a consumer agent 12 releases vague information about the consumer, vendor agent 10 may offer a lower bid or change the maximum incentive amount available. This may be due to rules explicitly tying acceptable incentive levels to the amount of information available and/or due to the fact that a closer match is not possible due to limited information.

Once vendor negotiation agent 10 and consumer negotiation agent 12 reach agreement, the terms are memorialized in ad contract 18. Ad contract 18 comprises the consumer's agreement to provide one or more advertising opportunities to the vendor and the vendor's agreement to provide the agreed-upon incentive(s). Terms and other information that may be included in the contract may include, but are not limited to: unique identification of the vendor, unique identification of the consumer or display means, data identifying the ad(s) to be shown, such as ad serial numbers or unique IDs, format definitions for the ad(s), ad metadata for matching the ad(s) to programming, ad ratings (such as ratings defined by the TV Parental Guidelines system) or content flags, time and method of delivery, times when the ad can/cannot be played, terms of payment for each display of the ad, when the ad is to be discarded (if ever), and any other suitable term or terms.

Of course, any of the above-mentioned terms (and any other terms) may be used in defining the conduct of negotiation agents 10 and 12. For instance, each party may define certain terms as non-negotiable and other terms as dependent on price. Rules for the auction and bidding process may then depend on the consumer's preferred terms. As an example, a consumer may define rules whereby the contract must prohibit "adult"-flagged ads and that the term is non-negotiable, while other terms regarding ad display resolution or bandwidth may be price-dependent (such as requiring higher bids for higher quality). Similarly, for a particular advertisement, a vendor may insist that any ad contract regarding that advertisement must provide for the ad to be shown during a certain time period or alongside certain content, while the number of showings is price-dependent (such as providing higher bids when more showings are offered).

For example, as noted above, a consumer may provide rules that prohibit consumer negotiation agent 12 from entering a contract to display ads of an adult nature. Therefore, if the consumer is auctioning an advertising opportunity, an offer from an advertiser of an ad with adult content may be refused, even if advertiser is offering an incentive that is higher than the other advertisers. Similarly, if the consumer is soliciting for an opportunity to receive ads, consumer negotiation agent 12 may be configured to ignore advertising opportunities where the offered ad is adult in nature, even if the incentive offered is above the consumer's threshold for acceptable incentive amounts. Of course, in either case, if the advertiser provides for a non-adult version of the ad to be available, successful negotiation may still be possible.

Contract 18 may be maintained as one or more components and in any suitable form or forms. For instance, both the consumer and the vendor may maintain a copy of contract 18 for future reference. In some embodiments, a copy of contract 18 may be provided to one or more third parties for safekeeping and/or verification in the event of a later dispute as to contract terms.

Once advertising contract 18 has been established between the consumer and the vendor, the remaining components of the advertising distribution system can access the terms of contract 18 and take steps to execute those terms. On the vendor side, one or more ad delivery agents 26 select ads from vendor ad storage 28 to send to the consumer. For instance, the vendor may maintain one or more repositories of ads for use with different audiences, and the appropriate ad may be selected based on information about the consumer. For example, a store may have produced a specific advertisement for English-speaking viewers and another advertisement for Spanish-speaking viewers. Based on consumer demographic or other information (and the contract terms), the appropriate ad may be selected.

For example, during the negotiation process, the vendor may have learned that the consumer is in a certain demographic (or the vendor may have only participated in negotiations where the consumer is in a desired demographic) and may select an ad that matches the demographic. Such consumer information may be provided, for example, by vendor negotiation agent 10. Alternatively, information used in selecting the ad may be included in contract 18. For instance, as noted above, contract 18 may specify the type of ad(s) to any degree of granularity, even to the point of uniquely identifying one or more particular advertisements in the contract. In any event, ad(s) that conform to contract and any vendor preferences are transmitted to consumer ad storage 30.

The ads may be transmitted in any suitable manner. For example, both the vendor and consumer may maintain connections over one or more wide-area networks such as the Internet. In other embodiments, the advertisements may be transmitted by other network connections-for instance, the ads may be transmitted using a cable television system's distribution channels to the consumer for video-on-demand content when such channels are not in use.

In some embodiments, the ad(s) are distributed out-of-band with regard to the content for display. For instance, the ad(s) may be provided to the consumer for storage separately from any content the ads are to be displayed with. As an example, a consumer and vendor may negotiate for display of an ad preceding a certain type of pay-per-view move. For instance, a camping equipment company may negotiate the display of an ad for survival equipment preceding an action movie. The ad may be distributed to the consumer where it is maintained in storage. The consumer may conceivably not view an action movie until after a considerable time after the time the ad is received.

Ad display can be handled by a consumer-side late binding agent 20 running on one or more computing devices associated with the consumer. For instance, the late binding agent may be included in software running on a television set-top box (STB). Although various examples herein use a set-top box, the functionality provided by components such as the late binding agent, viewer profiles, ad storage, video content storage, and user interface may be provided any suitable hardware including, but not limited to, the set top box, a personalized video recorder, personal computer, multi-function multimedia center, home gateway router, dedicated computing device, and remote proxy server or client.

Based on data including the terms of contract 18, the consumer's viewing activity, and consumer preferences, late binding agent 20 selects one or more stored ads and directs playback and mixing software/circuitry to mix and otherwise display the ads with content 32. Details of an exemplary late binding agent 20 are discussed in FIGS. 2A and 2B. As noted above, for virtual world ads, ad insertion system 114 may handle some or all of generating the virtual world ad alone or in conjunction with a late binding agent. In some embodiments, functionality provided by late binding agent 20 and ad insertion system 114 may be provided by the same software agent(s) or other component(s).

Figure 7A:
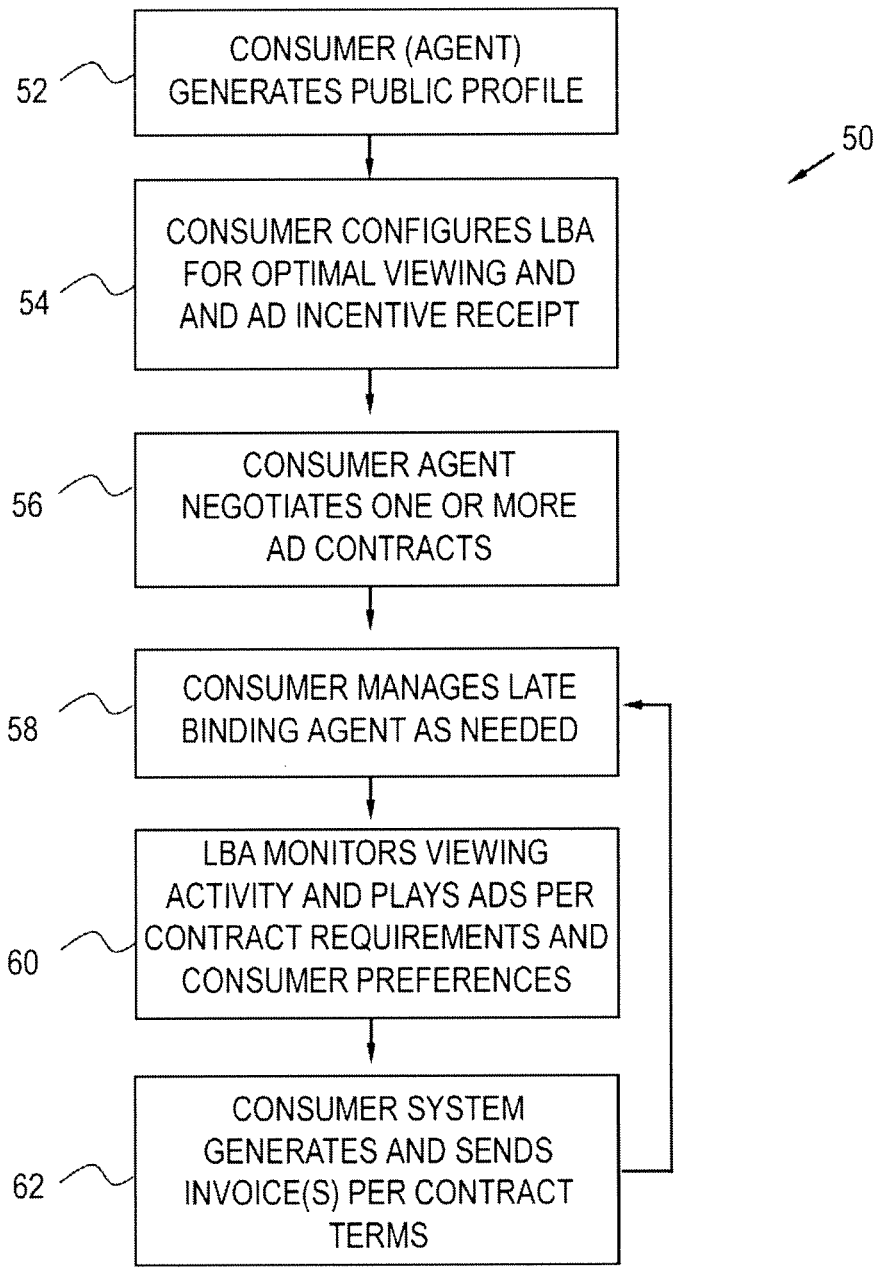
FIG. 7A is a flow chart showing exemplary steps in a method for negotiating and implementing display of one or more advertisements.

FIG. 7A is a flowchart that includes steps in an exemplary process 50 performed by a late binding agent alongside some actions performed by consumer negotiation agent 12. First, at step 52, the consumer (and/or a profiling agent acting on behalf of the consumer) generates one or more profiles including a public profile of the consumer. For instance, the public profile may include data about the consumer's tastes, interests, viewing habits, and the like that the consumer is comfortable revealing. For instance, as noted above in FIG. 6, consumer profile data 14 may be used in the negotiation process. At step 54, the consumer configures the late binding agent (LBA) for optimal viewing and ad incentive receipt. For instance, the consumer may specify preferred types and amounts of incentives, preferred advertising content and amount, and other information relating to the consumer's viewing preferences. This information can be included in the data used to control the actions of late binding agent 20. The parameters may be provided through a consumer preferences interface, which may, for example, comprise a graphical user interface provided via the consumer's set top box and/or other computing device, such as a home computer.

At step 56, one or more consumer agents negotiate one or more ad contracts as noted above. Steps 58, 60, and 62 generally represent ongoing activity with regard to the late binding agent. For instance, at step 58, the consumer manages the late binding agent on an as-needed basis. Step 58 is meant to include feedback provided by the consumer and maintenance tasks and other interventions. For example, the consumer may indicate that certain advertisements/programming are preferred or disliked. As another example, the consumer may delete certain advertisements or content from storage. As a further example, the consumer may set (and/or update) programming and advertisement preferences and restrictions, such as locking out certain programming, categories of advertisements, and/or channels.

At step 60, the late binding agent monitors activity and plays ads in accordance with contract requirements and consumer preferences. Of course, the late binding agent may consider other parameters, such as requirements provided by the content provider—for example, a cable company may mandate that viewers play certain advertisements at certain times. At step 62, the late biding agent (or other software) generates and sends one or more invoices per the terms of the stored ad contract(s).

Figure 7B:
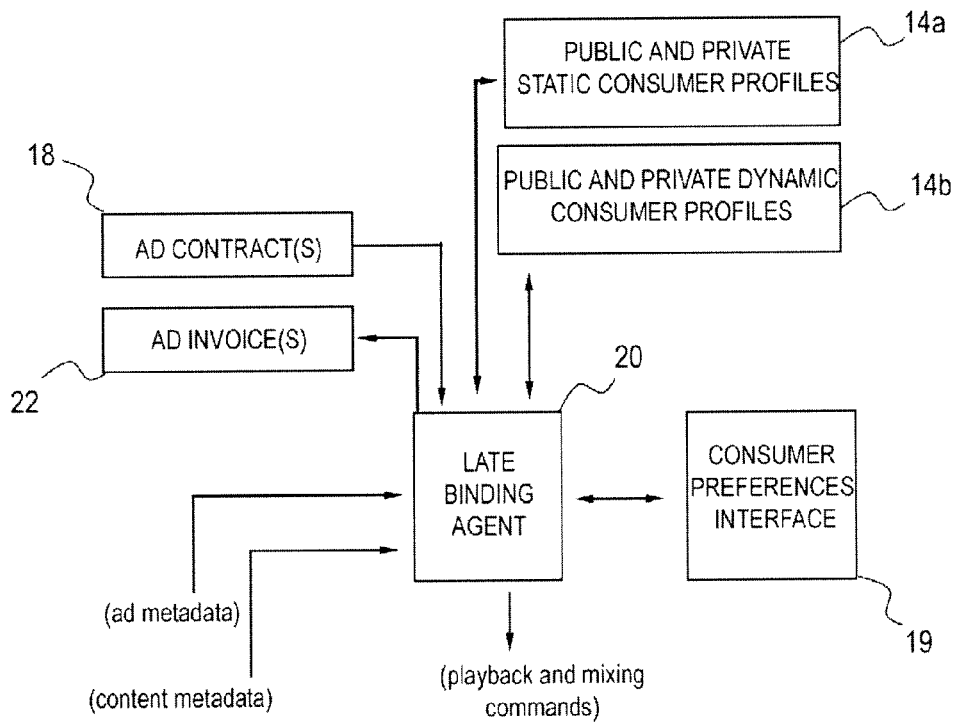
FIG. 7B is a block diagram showing an exemplary late binding agent in the context of exemplary data provided to the agent and by the agent.

FIG. 7B is a block diagram showing an exemplary late binding agent 20 in further detail. In this example, late binding agent 20 has access to stored ad contract or contracts 18. Based on data including ad metadata, content metadata, profiles 14a and 14b, and consumer preferences provided via consumer preferences interface 19, late binding agent 20 provides playback and mixing commands such that advertisements are presented to the consumer at the optimal time and in accordance with the terms of the applicable contract or contracts. Then, late binding agent 20 generates one or more invoices 22 in order that the consumer receives payment. Profiles 14a and 14b may each represent one or more static and dynamic consumer profiles, respectively. For instance, the system may maintain both a static private profile of the consumer and a static public profile of the consumer alongside dynamic private and public profiles. For example, the dynamic profile(s) may be based on an ongoing viewing session or recent viewing activity. As was noted above, the public profiles may be used for providing data during negotiations and other interactions with outside entities, while the private profiles may be used internally by the consumer's software agents.

Returning to FIG. 6 and the example of the camping store's survival gear advertisement, late binding agent 20 monitors the consumer's viewing activity with regard to content 32. For example, the consumer may use the STB to order an action movie that is downloaded to local storage for later viewing. Late binding agent 20 monitors the consumer's viewing activity and consults stored ad contract 18 to determine if the ordered movie meets the terms of the contract and that other terms of the contract are satisfied. For example, as noted above, the terms may provide that ads are to be discarded or age out of the system after a certain time period. If the movie is ordered after the survival gear ad has aged out of the system, then a different (or no) advertisement may be displayed. However, assuming that the ad has not aged out of the system, the ad may be presented to the consumer when the action movie is played. For example, the STB may insert the ad for camping gear following the movie.

After the advertisement is displayed, late binding agent 20 generates an invoice 22 and sends the invoice to the applicable vendor. Invoice generation and transmittal is carried out pursuant to the terms of ad contract 18. For example, ad contract 18 may provide for terms that vary based on the circumstances of ad display. For instance, the incentive due to a consumer may depend on factors including, but not limited to: when an ad is displayed, the particular content during which the ad is displayed, and whether ad viewing is confirmed. For example, ad contract 18 can include a bonus term that increases the ad payment if the ad is actually viewed. Ad contract 18 may also specify how the invoice 22 is to be delivered, such as the format, required data, and network address for electronic delivery. Based on the terms of contract 18 and the circumstances of the display of the ad, late binding agent 20 constructs one or more invoices. For instance, if profile (or other data) indicates that the consumer actually viewed the ad, then (if the contract provides for a bonus) invoice 22 may include a demand for higher payment to the consumer. The invoice may further include feedback or other data. For instance, the invoice may include data that confirms that the consumer actually viewed the ad that was displayed. If contract 18 provides for options (such as alternative payment options), then late binding agent 20 may select the most favorable options based on consumer preferences.

Invoice 22 is received by reimbursement function 24, which may comprise one or more software programs, processes, components or software agents operating on behalf of the vendor. For example, reimbursement function 24 may include software that compares data included in invoice 22 to the terms of the ad contract 18 to ensure that all terms have been met and to schedule payment or delivery of other incentive(s) to the consumer. Any suitable incentive or incentives may be provided. As an example, incentives can include direct payments to bank or merchant accounts, vendor service credits or coupons, credit on broadband access, content provider, or other bills, or other incentives such as airline miles or credit-card reward points. Reimbursement function 24 may include interfacing with other vendor systems, such as internal accounting systems and/or third party systems to ensure that the consumer is paid in accordance with the contract terms. Any suitable payment systems and methodologies may be used. Invoice 22 may be provided directly to the vendor and/or may be sent by late binding agent 20 to one or more third parties (if designated in the contract) for handling payment.

As was noted above, in some embodiments, payment terms may depend on factors including whether an ad is actually viewed by a consumer, and not just displayed. Any suitable method(s) may be used to confirm viewing. For example, a virtual world ad may be interactive, with viewing confirmed by determining if one or more actions taken by the consumer during the ad were the result of actual consumer feedback and not default actions. Feedback data based on the response or responses provided by the consumer (if any) during advertisements may be included in invoice 22.

The invoice may be generated and/or delivered at the time an ad is displayed, viewed, and/or at another time, depending on the terms of the contract. For example, the contract may provide for an ad to be played ten times. Thus, an invoice may not be sent until after the ad has been played a tenth time. Alternatively, if the contract provides for partial payments, multiple invoices may be sent. Although not discussed in detail herein, an invoice may be generated and sent upon download of an advertisement if the contract terms provide for payment regardless of whether the ad is displayed or viewed. Additionally, invoices may be sent singly in some embodiments and in batches or groups in some embodiments.

As noted above, in some embodiments, consumers auction or otherwise sell (to one or more vendors) the opportunity to provide an ad. However, in other embodiments, a vendor may conduct negotiations in which one or more consumers solicit the opportunity to receive ads and incentives from the vendor. In such embodiments, for example, the vendor may offer a maximum incentive and the consumers then offer advertising opportunities in exchange for the incentive amount. Competition amongst consumers may advantageously result in better advertising opportunities per unit of incentive as the consumers compete with one another for the incentive(s) offered by the vendor.

The particular exemplary embodiments of a consumer-centric advertising system discussed above are not intended to limit the subject matter. For instance, the consumer-centric advertising distribution system could be modified or adapted to provide for virtual world advertisement delivery across multiple devices or to manage virtual world advertisement inventory in a more sophisticated manner. As another example, other advertising distribution systems could be used in distributing virtual world ads.

It is appreciated by persons skilled in the art that what has been particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed:

1. An advertising device comprising:
   a processor;
   memory;
   an ad solicitation agent embodied in the memory of the advertising device and adapted to:
      access ad definition data comprising content for a virtual world advertisement;
      access data comprising at least one consumer preference for virtual world advertisement presentation, wherein the at least one consumer preference is defined by a profile that defines when a virtual world is to be implemented and what type of the virtual world is to be implemented; and
      select an advertisement based on the at least one consumer preference; and
   an ad insertion system embodied in the memory of the advertising device and adapted to:
      render the virtual world based on the data comprising the at least one consumer preference; and
      generate the advertisement in conjunction with the virtual world based on the ad definition data.

2. The advertising device as set forth in claim 1,
   wherein the ad solution agent is further adapted to select the virtual world from a plurality of virtual worlds based on the at least one consumer preference; and
   wherein rendering the virtual world comprises rendering the selected virtual world.

3. The advertising device as set forth in claim 1, wherein the ad definition data comprises an ad script, and wherein generating an advertisement in conjunction with the virtual world comprises executing the ad script.

4. The advertising device as set forth in claim 3, wherein the advertising device continues rendering the virtual world after the ad script has been executed.

5. The advertising device as set forth in claim 1,
   wherein the ad insertion system selects an ad time slot having a predetermined length, the ad time slot associated with a programming event; and
   wherein the advertising device is further adapted to record the programming event as the virtual world continues to be rendered after the end of the ad time slot.

6. The advertising device as set forth in claim 1, wherein the ad insertion system is further adapted to personalize the virtual world advertisement based on the ad definition data, including selecting from a plurality of content options included in the ad definition data.

7. The advertising device as set forth in claim 6, wherein personalizing comprises accessing consumer profiling data in response to a query provided in the ad definition data.

8. The advertising device as set forth in claim 1, wherein the ad solicitation agent is further adapted to:
   negotiate with at least one advertising entity, including establishing at least one contract regarding display of the virtual world advertisement to a consumer.

9. The advertising device as set forth in claim 8, wherein the advertising device is further adapted to:
   download a data package comprising the ad definition data for the virtual world advertisement; and
   provide an invoice to the at least one advertising entity if the virtual world advertisement is displayed in accordance with the at least one contract.

10. The advertising device as set forth in claim 1, wherein the ad solicitation agent is further adapted to access ad definition data comprising content for a second virtual world advertisement.

11. The advertising device as set forth in claim 10, wherein the advertising device further comprises an ad queue defining an order of presenting ads and the first and second virtual world advertisements are adjacent to one another in the order defined by the ad queue.

12. The advertising device as set forth in claim 10, wherein the ad insertion system is adapted to present the second virtual world advertisement in the virtual world.

13. A computerized method of providing an advertisement, the method comprising:
- accessing ad definition data comprising content for a virtual world advertisement;
- accessing consumer preference data comprising at least one consumer preference for presentation of virtual world advertisements, wherein the at least one consumer preference is defined by a profile that defines when a virtual world is to be implemented and what type of the virtual world is to be implemented;
- selecting an advertisement based on the at least one consumer preference;
- rendering the virtual world based on the consumer preference data; and
- outputting the advertisement in conjunction with the virtual world based on the ad definition data from a computing system.

14. The method as set forth in claim 13, further comprising selecting the virtual world from a plurality of virtual worlds based on the consumer preference data;
- wherein the virtual world that is rendered is a selected virtual world.

15. The method as set forth in claim 13, wherein outputting the advertisement in the virtual world comprises executing at least one ad script included in the ad definition data.

16. The method as set forth in claim 15, further comprising:
- continuing to render the virtual world after the at least one ad script has been executed.

17. The method as set forth in claim 13, further comprising selecting an ad slot associated with a programming event and having a predetermined length and recording the programming event as the virtual world is rendered after the end of the ad slot.

18. The method as set forth in claim 13, further comprising personalizing the virtual world advertisement based on the ad definition data, wherein personalizing comprises selecting at least one option from a plurality of optional content items included in the ad definition data.

19. The method as set forth in claim 18, wherein personalizing comprises accessing consumer profiling data in response to a query provided in the ad definition data.

20. The method as set forth in claim 13, wherein presenting comprises:
- rendering the virtual world and generating the virtual world advertisement using at least a first computing device;
- transmitting the rendered virtual world and generated advertisement to a second computing device; and
- providing the rendered virtual world and generated advertisement to a consumer by using the second computing device to insert the rendered virtual world and generated advertisement at an ad presentation point in a content presentation.

21. The method as set forth in claim 13, further comprising:
- negotiating with at least one advertising entity, including establishing at least one contract regarding display of the virtual world advertisement to a consumer;
- downloading a data package comprising the ad definition data for the virtual world advertisement; and
- providing an invoice to the at least one advertising entity if the virtual world advertisement is displayed in accordance with the at least one contract.

22. The method as set forth in claim 13, further comprising:
- accessing the ad definition data comprising content for a second virtual world advertisement; and
- presenting the second virtual world advertisement in the virtual world.

* * * * *